US012043062B2

(12) United States Patent
Herman

(10) Patent No.: US 12,043,062 B2
(45) Date of Patent: Jul. 23, 2024

(54) MECHANISM OF AN ADJUSTABLE HANDLING WHEEL AND METHOD OF POSITIONING THEREOF

(71) Applicant: LINET spol. s.r.o., Slany (CZ)

(72) Inventor: Jakub Herman, Ostrava-Hrabova (CZ)

(73) Assignee: LINET spol. s.r.o., Slany (CZ)

( * ) Notice: Subject to any disclaimer, the term of this patent is extended or adjusted under 35 U.S.C. 154(b) by 0 days.

(21) Appl. No.: 18/000,852

(22) PCT Filed: Jun. 8, 2021

(86) PCT No.: PCT/CZ2021/000024
§ 371 (c)(1),
(2) Date: Dec. 6, 2022

(87) PCT Pub. No.: WO2021/249582
PCT Pub. Date: Dec. 16, 2021

(65) Prior Publication Data
US 2023/0211633 A1    Jul. 6, 2023

(30) Foreign Application Priority Data
Jun. 10, 2020    (CZ) .............................. PV 2020-330

(51) Int. Cl.
*B60B 33/06* (2006.01)
*A61G 1/02* (2006.01)

(52) U.S. Cl.
CPC .......... *B60B 33/066* (2013.01); *A61G 1/0268* (2013.01); *B60B 2200/20* (2013.01)

(58) Field of Classification Search
CPC ..... B60B 33/06; B60B 33/063; B60B 33/066; A61G 13/104; A61G 1/0268; A61G 15/002; A47B 91/16; A47B 91/002; A47B 91/005
(Continued)

(56) References Cited

U.S. PATENT DOCUMENTS 124,106 A * 2/1872 Wright .................... B60B 33/06
280/43
350,333 A * 10/1886 White ..................... B60B 33/06
16/34
(Continued)

FOREIGN PATENT DOCUMENTS

DE    9316391 U1    1/1994
GB    460935 A    2/1937

OTHER PUBLICATIONS

European Patent Office, International Searching Authority, International Search Report, dated Nov. 18, 2021, in International Application No. PCT/CZ2021/000024, filing date Jun. 8, 2021.
(Continued)

*Primary Examiner* — Jeffrey O'Brien
(74) *Attorney, Agent, or Firm* — Thedford I. Hitaffer; Hitaffer & Hitaffer, PLLC

(57) ABSTRACT

A mechanism for deploying and retracting an adjustable handling wheel from under different types of equipment supported on the floor, or different types of furniture, such as chairs, medical chairs, nursery chairs, examination chairs, bedside tables, beds without chassis, cabinets and others. The mechanism enables very easy handling and movement of the equipment or furniture from one place to another place.

3 Claims, 9 Drawing Sheets

(58) Field of Classification Search
USPC .................................................. 16/32, 33, 34
See application file for complete search history.

(56) References Cited

U.S. PATENT DOCUMENTS

| | | | | |
|---|---|---|---|---|
| 813,438 A * | 2/1906 | Landis | .................... | B60B 33/06 |
| | | | | 16/34 |
| 1,092,808 A * | 4/1914 | Culver | .................... | B60B 33/06 |
| | | | | 16/33 |
| 1,268,651 A * | 6/1918 | Walter | .................... | B60B 33/06 |
| | | | | 16/33 |
| 2,774,986 A * | 12/1956 | Moorehouse | ........... | B60B 33/06 |
| | | | | 16/34 |
| 2,841,410 A * | 7/1958 | Kessler, Jr. | ............. | B60B 33/06 |
| | | | | 280/43.15 |
| 3,260,533 A * | 7/1966 | Ryder | .................... | B60B 33/06 |
| | | | | 280/43.1 |
| 3,304,116 A * | 2/1967 | Stryker | ................... | A61G 7/00 |
| | | | | 5/81.1 R |
| 3,972,544 A * | 8/1976 | Soot | ......................... | B60P 3/34 |
| | | | | 280/30 |
| 4,008,507 A * | 2/1977 | Smith | .................... | B60B 33/06 |
| | | | | 280/43.24 |
| 4,378,191 A * | 3/1983 | Sato | ........................ | B60P 1/027 |
| | | | | 280/43.12 |
| 4,417,738 A * | 11/1983 | Kendall | ................. | B60B 33/06 |
| | | | | 280/43.24 |
| 4,518,142 A * | 5/1985 | Sulcek | ................... | A47B 91/02 |
| | | | | 248/649 |
| 4,555,827 A * | 12/1985 | St. Louis | ............... | B60B 33/06 |
| | | | | 16/33 |
| 4,773,123 A * | 9/1988 | Yu | ......................... | A45C 5/146 |
| | | | | 280/37 |
| 4,805,542 A * | 2/1989 | Peterson | ............... | A47B 13/08 |
| | | | | 108/150 |
| 4,840,020 A * | 6/1989 | Oka | ....................... | A01D 34/63 |
| | | | | 172/395 |
| 5,348,326 A * | 9/1994 | Fullenkamp | .......... | A61G 1/042 |
| | | | | 280/43 |
| 5,533,231 A * | 7/1996 | Bai | .................... | B60B 33/0039 |
| | | | | 16/34 |
| 5,806,111 A * | 9/1998 | Heimbrock | .......... | A61G 1/0225 |
| | | | | 280/47.371 |
| 5,845,471 A * | 12/1998 | Seegert | .................. | A01D 34/74 |
| | | | | 56/17.2 |
| 6,446,283 B1 * | 9/2002 | Heimbrock | .......... | A61G 7/0519 |
| | | | | 5/430 |
| 6,507,975 B2 * | 1/2003 | Maupin | ............... | B60B 33/0057 |
| | | | | 16/34 |
| 6,792,630 B1 * | 9/2004 | Palmatier | ............ | B60B 33/0063 |
| | | | | 280/43.17 |
| 8,590,073 B2 * | 11/2013 | Bly | ........................ | F16H 35/14 |
| | | | | 5/611 |
| 9,132,053 B1 * | 9/2015 | Ferreri | ................ | A61G 13/104 |
| 9,333,823 B2 * | 5/2016 | Shahroodi | ............. | B60D 1/665 |
| 9,586,442 B2 * | 3/2017 | Trickle | ............... | B60B 33/0005 |
| 9,849,723 B2 * | 12/2017 | LaFever | ............. | B60B 33/066 |
| 10,336,135 B1 * | 7/2019 | Engelbrecht | ........ | B60B 33/0063 |
| 10,799,403 B2 * | 10/2020 | Paul | ........................ | A61G 7/08 |
| 11,071,670 B2 * | 7/2021 | Dellaca | ................ | A61G 1/0268 |
| 11,129,760 B2 * | 9/2021 | Patmore | .............. | A61G 1/0237 |
| 11,155,120 B2 * | 10/2021 | Ojima | ................ | B60B 33/0042 |
| 11,166,559 B1 * | 11/2021 | Kadoch | .................. | B60B 33/04 |
| 11,246,413 B2 * | 2/2022 | Hiorth | .................. | A47B 91/002 |
| 11,304,860 B2 * | 4/2022 | Derenne | ............. | A61G 7/08 |
| 11,311,439 B2 * | 4/2022 | Wilson | .................... | A61G 7/08 |
| 11,484,447 B2 * | 11/2022 | Derenne | .............. | A61G 1/0237 |
| 11,643,123 B2 * | 5/2023 | Yifrah | .................. | B62B 5/0046 |
| | | | | 180/19.2 |
| 2005/0217071 A1 * | 10/2005 | Shinner | ............... | B60B 33/0028 |
| | | | | 16/19 |
| 2013/0200246 A1 * | 8/2013 | VanBenschoten | .... | B60B 33/063 |
| | | | | 248/519 |
| 2014/0130299 A1 * | 5/2014 | Jaranson | ............... | E05F 1/1215 |
| | | | | 16/50 |
| 2018/0099180 A1 * | 4/2018 | Wilkinson | .......... | A63B 71/023 |
| 2021/0301569 A1 * | 9/2021 | Elkasevic | .............. | E05D 11/06 |
| 2022/0324280 A1 * | 10/2022 | Sheikh Jafari | ....... | B60B 33/0063 |
| 2023/0255839 A1 * | 8/2023 | Lacasse | ................ | B60B 19/003 |
| | | | | 5/600 |
| 2024/0123763 A1 * | 4/2024 | Li | .......................... | A63H 33/00 |

OTHER PUBLICATIONS

European Patent Office, International Searching Authority, Written Opinion, dated Nov. 18, 2021, in International Application No. PCT/CZ2021/000024, filing date Jun. 8, 2021.

* cited by examiner

MECHANISM OF AN ADJUSTABLE HANDLING WHEEL AND METHOD OF POSITIONING THEREOF

CROSS-REFERENCE TO RELATED APPLICATIONS

This application, filed under 35 USC 371, is a United States National Stage Application of International Application No. PCT/CZ2021/000024 filed Jun. 8, 2021, which claims priority to Czech Patent Applicaitron No. PV 2020-330 filed Jun. 10, 2020, the disclosures of which are incorporated herein by reference in their entireties.

TECHNICAL FIELD

A technical solution describes a mechanism of deployment and retracting an adjustable handling wheel from under different types of equipment standing on the floor, or different types of furniture such as chairs, medical chairs, nursery chairs, examination chairs (hereinafter generally as chairs), bedside tables, beds without chassis, cabinets and others. The solution presented in this patent application enables very easy handling and movement of said furniture from one place to another place using very simple mechanism of adjustable handling wheel, which is hidden in the bottom part of said equipment or furniture.

PRIOR ART

The existing types of medical chairs, nursery chairs, or examination chairs such as gynaecological or stomatology chairs (hereinafter as chairs generally) stand, in majority cases, statically in one place and use to be also very heavy. Therefore, they are difficult to be moved, usually several people or any transport equipment such as walkie truck are needed to move such chair to another place.

Some medical or nursery chairs, tables or beds may be equipped with two or four handling wheels to be transported or moved. The prior art recognizes visible wheels of small diameter to obstruct as less as possible due to the fact that the wheels are visible. In addition, such wheels need to be equipped with a brake to avoid any undesired movement of a chair or bed when examining a patient, or to avoid passing under a patient and consequent fall of a patient causing other injuries. Visible wheels incline to be dusty because they are not used often and therefore become a source of impurities which causes another problem to caregivers.

As previously said, disadvantage of these wheels is necessity to have a brake. Should a chair or any other equipment have four wheels or casters, at least two wheels need to be braked, preferably all four wheels are equipped with a brake. In case a caregiver forgets to brake a wheel, a chair may undesirably start to self-move caused by for example uneveness of the ground the chair stands on. Also, in case a caregiver forgets to brake the wheels of the chair and somebody leans against the chair, it may self-move causing risky situations with injury potential. These braked wheels have very often small brakes, difficult to access, formed as small plastic fixtures which are easy to be broken and then the wheel is not possible to be braked or unbraked at all depending in which position the brake control mechanism had been broken.

Prior art solution is described for example in the document U.S. Pat. No. 5,845,471 (A) showing an adjustable gauge wheel assembly for use on rotary mower decks. The wheel and its axle are carried on an arm which is pivotally supported by a deck mounted bracket. The pivotal support is adapted to allow the arm to be shifted towards and away from the bracket. The axle includes a portion which protrudes through the arm for insertion into one of the plurality of vertically spaced openings in the bracket as the arm is shifted. The bracket therefore provides for vertical adjustment of the gauge wheel as well as a direct support against impact loadings encountered by the wheel. An over-centre latch mechanism is provided to lock the arm in its adjusted position. Disadvantage of this assembly is that each time a user wants to change the wheel position, he needs to release the wheel from the given opening and move it into another opening and fix it again in this position by latch mechanism. To make such change the user needs to have necessary tools available and with him.

A document U.S. Pat. No. 3,972,544 describes amphibious structure with retractable suspension system where as handling wheel of this structure move from chassis toward the floor using lever mechanism where the lever draws the wheel from one position to another position. Disadvantage of this solution is very difficult manipulation, complex technical design, necessity to have sufficient space around and finally financially demanding structure.

A document U.S. Pat. No. 4,840,020 describes rear wheel of a mower or reaper whose height is adjusted using an adjusting element with many openings on the bottom part of the tube coupled with the frame of the mower. To change the wheel position a user needs to have relevant tools again which the innovative solution presented in this document removes. Despite possibility to adjust the height position of the wheel in this prior art document, the solution is in principle very unpractical. Upon each change the position needs to be manually changed in the given opening and fixed by a screw.

The aim of this technical solution presented herein is to deploy or release a wheel from under the base frame so that the chair could move from one place to another. The mechanism is designed to be easily handled without necessity of using any other tools and to be cheap and simple in construction. The subjected mechanism works based on change of position of the equipment under which the mechanism is located.

SUMMARY OF THE INVENTION

The above mentioned substantial disadvantages are solved by presented hidden handling or manipulating wheel. The hidden handling wheel is preferably used with any static standing equipment or furniture such as nursery and medical patient support apparatuses, medical and examination chairs of any type etc. It may be used also outside medical area with other types of furniture such as chairs, beds, bedside tables, tables, cases, cabinets, sofas etc. The hidden handling wheel is used for easy transport of any equipment from one place to another or for partial movement aside.

Mechanism of adjustable handling wheel comprises a base frame, a supporting member, which may be a part of the base frame in preferred embodiments, and two arms where at least one of the arms is a supporting arm which the handling wheel is attached to and another arm is a handling arm comprising a shaped slotted link.

The adjustable handling wheel is attached to the base frame by supporting arm, which is fixed to the base frame by means of a pin at one end and at another end is the handling wheel fixed by a pivot or a screw. The supporting arm is coupled with second arm, which is control arm, using a pin as well. The control arm comprises a slotted link with a groove in which is a sliding member through which the pin from the supporting arm goes through. The pin of the supporting arm is pivotably fixed in the slotted link of the sliding member of the control arm which is attached to the base frame at least at one end of the control arm. Preferably, both arms are attached to the supporting member, which can be for example any profile fixed to the top side of the base frame so that the wheel becomes part of the base in the retracted, i.e. non-handling, position.

A fundamental part of this innovative solution presented herein is a mechanism of positioning of the handling wheel. The supporting arm of the adjustable handling wheel moves by means of a pin located in the sliding member, which is a part of the slotted link of the control arm, kinematically according to which position the base frame of a chair, or any equipment, is tilted to. In the first position—retracted, i.e. non-handling position, the pin in the slotted link is in its highest position. If it is necessary to use the handling wheel and thus activate the wheel, the base of a chair, or similar equipment, needs to be raised up at one side to become tilted and the pin of the supporting arm comprising the sliding member in the slotted link could move thanks to gravitation into the prepared activating position to roughly middle part of the slotted link where the pin falls into the activation point of the slotted link. The pin with sliding member gets jammed in this activation point of the slotted link and locks or secures the wheel in the active, i.e. handling, position by virtue of own weight of the chair, or other equipment. The active, i.e. handling, position causes lifting the chair, or other equipment, above the ground and easy handling or transport of a chair from one place to another, or moving the chair aside to required place. In case the wheel needs to be deactivated again and get to the retracted, i.e. non-handling, position, the chair needs to be easily raised up again so that the pin of the supporting arm comprising the sliding member in the slotted link could move thanks to gravitation into the lowest position—so called prepared deactivating position where the pin releases. When moving the chair, or other equipment, back to plain level, the pin moves in the slotted link of the control arm, thanks to own weight of the chair, into the highest position—retracted, i.e. non-handling, position, where it remains. The adjustable handling wheel changes its position into the retracted, i.e. non-handling, position where it remains until being activated again by changing position or rather tilting of the chair.

In the preferred embodiment, two hidden adjustable handling wheels are located under a chair, or any other equipment, against each other in the middle of the base frame. Optionally, at least one adjustable handling wheel is located under a chair, or any other equipment, which enables moving the said chair or equipment to any required place. In another preferred embodiment, any number of such adjustable handling wheels can be attached to the base frame depending on the size of the subjected chair, or equipment, and then the size of the mechanism of adjustable handling wheel will pro rate correspond to the size of the given chair, or equipment. The adjustable handling wheel is preferably made from metal components but can be made from metal alloys, plastic material or combination of plastic and metal materials with sufficient rigidity and bearing capacity.

LIST OF DRAWINGS

The FIG. 1 shows side elevation of a nursery chair with cross section of a base part showing visibly fixing of an adjustable handling wheel to a base frame of the chair.

The FIG. 2 shows axonometric projection of supporting and fixing a mechanism of an adjustable handling wheel shown from the outward frame side.

Figure 5:
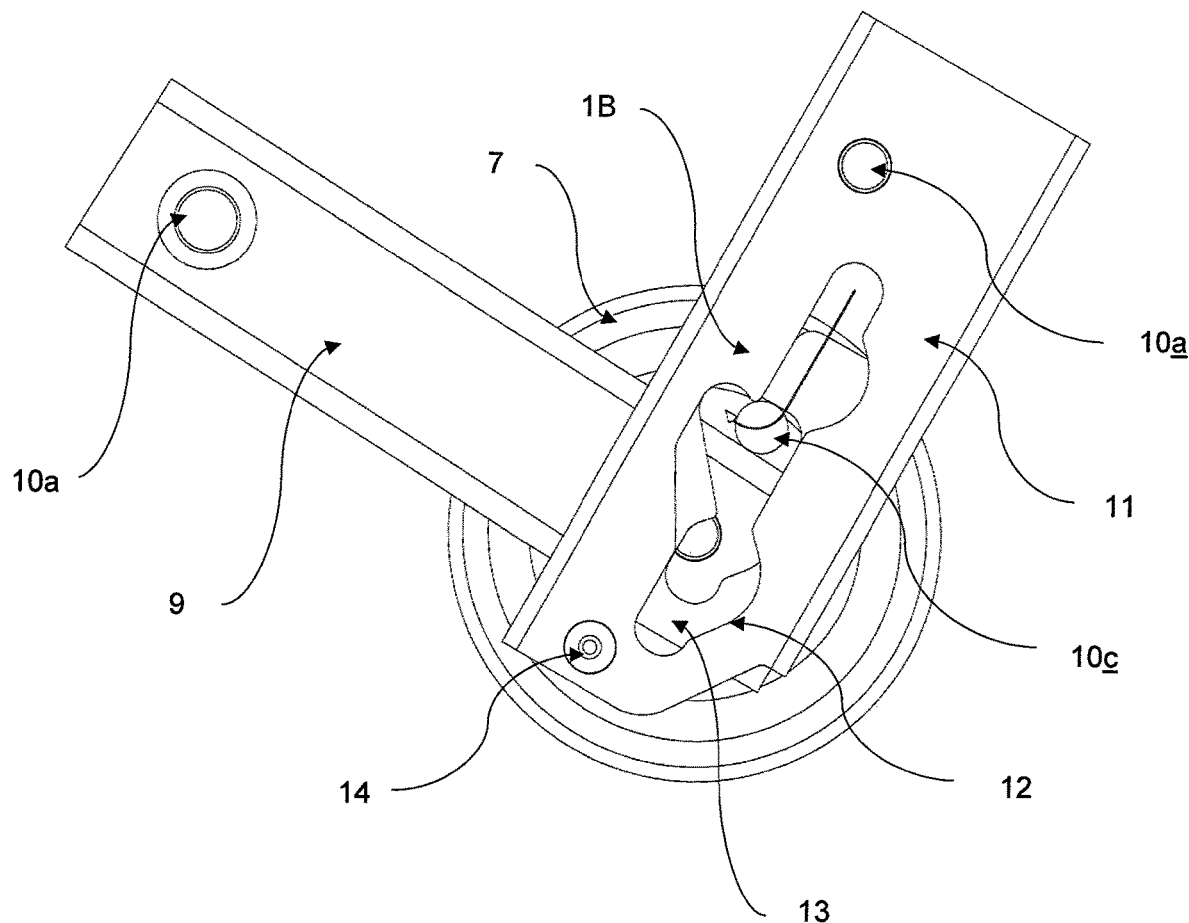

FIG. 5 je shows side elevation of a mechanism of an adjustable handling wheel in the prepared activating position.

Figure 6:
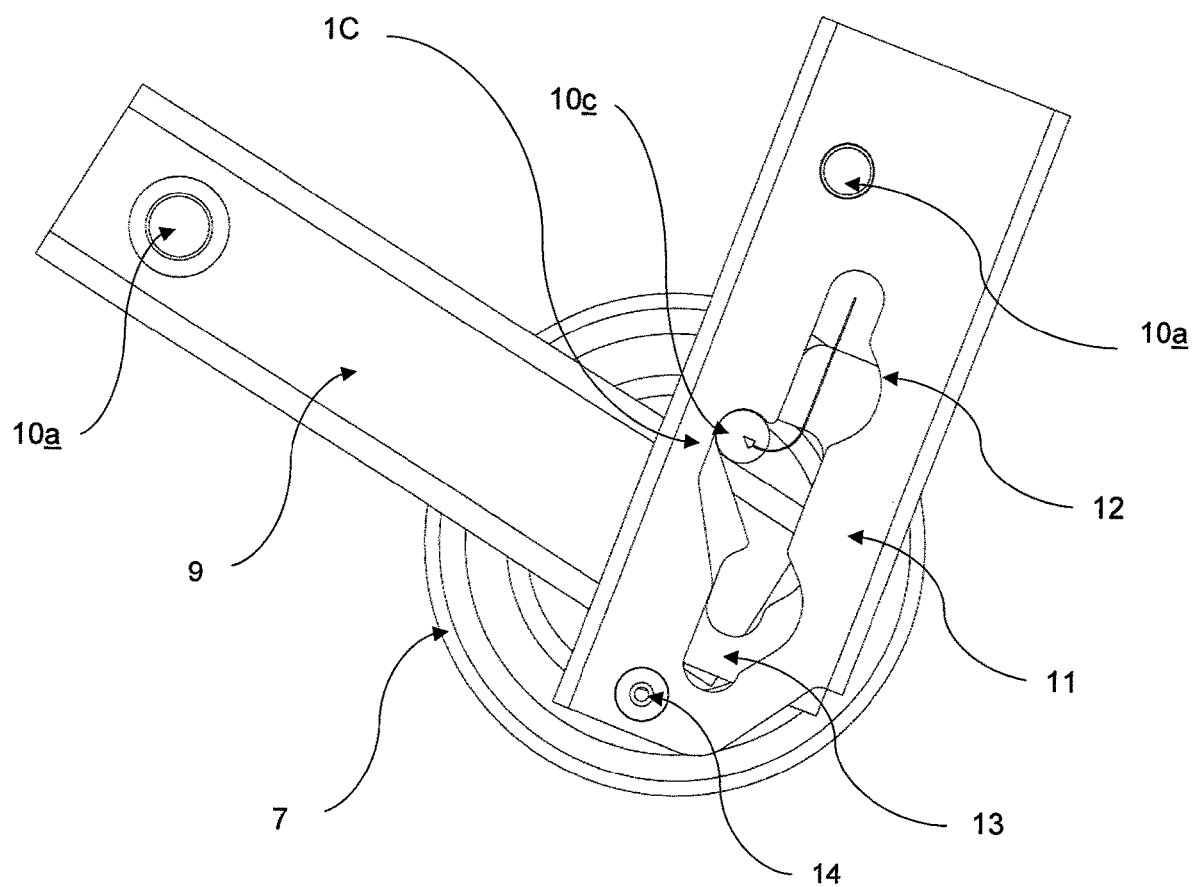

FIG. 6 shows side elevation of a mechanism of an adjustable handling wheel in the active, i.e. handling, position.

Figure 7:
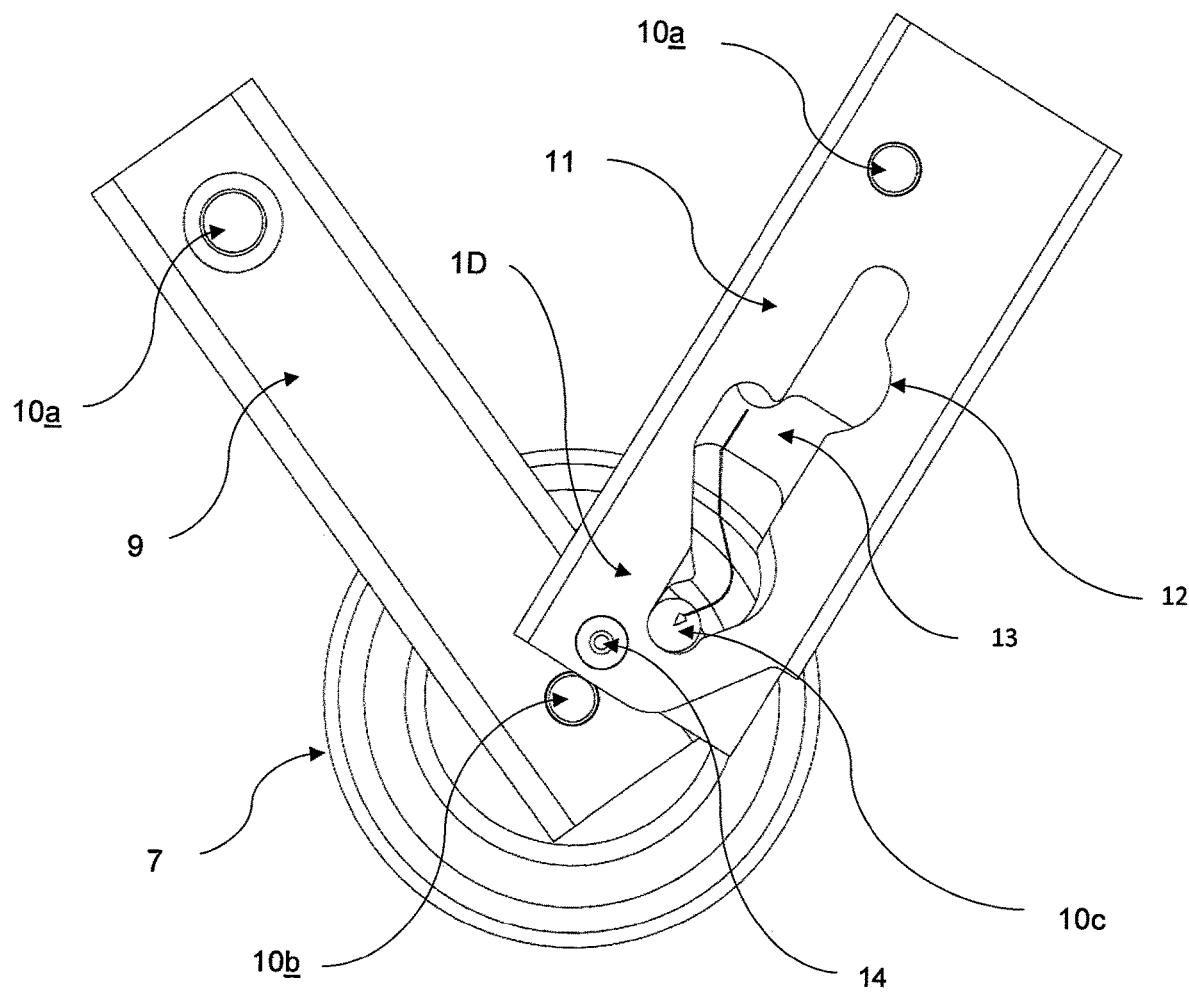

FIG. 7 shows side elevation of a mechanism of an adjustable handling wheel in the prepared deactivating position to store a chair or any other equipment.

Figure 8:
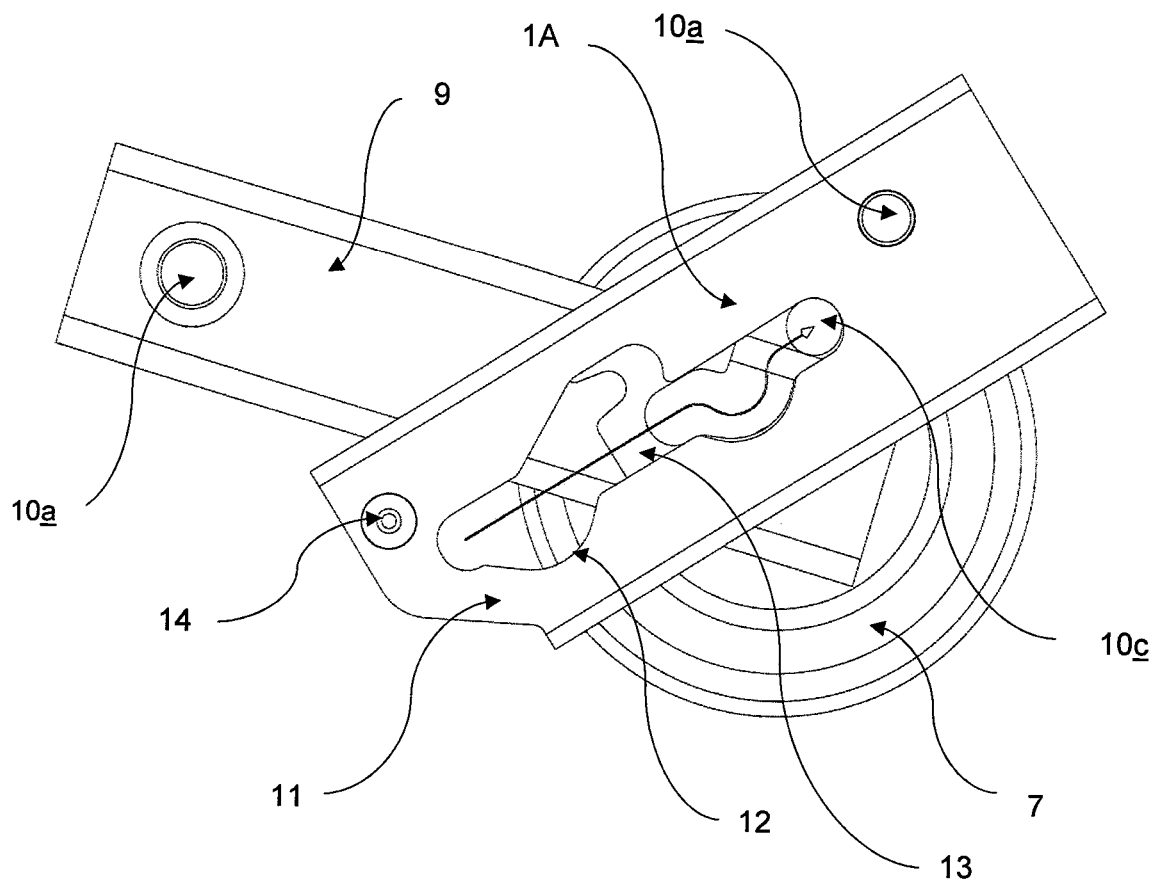

FIG. 8 shows side elevation of a mechanism of an adjustable handling wheel again in the retracted, i.e. non-handling, position.

Figure 9:
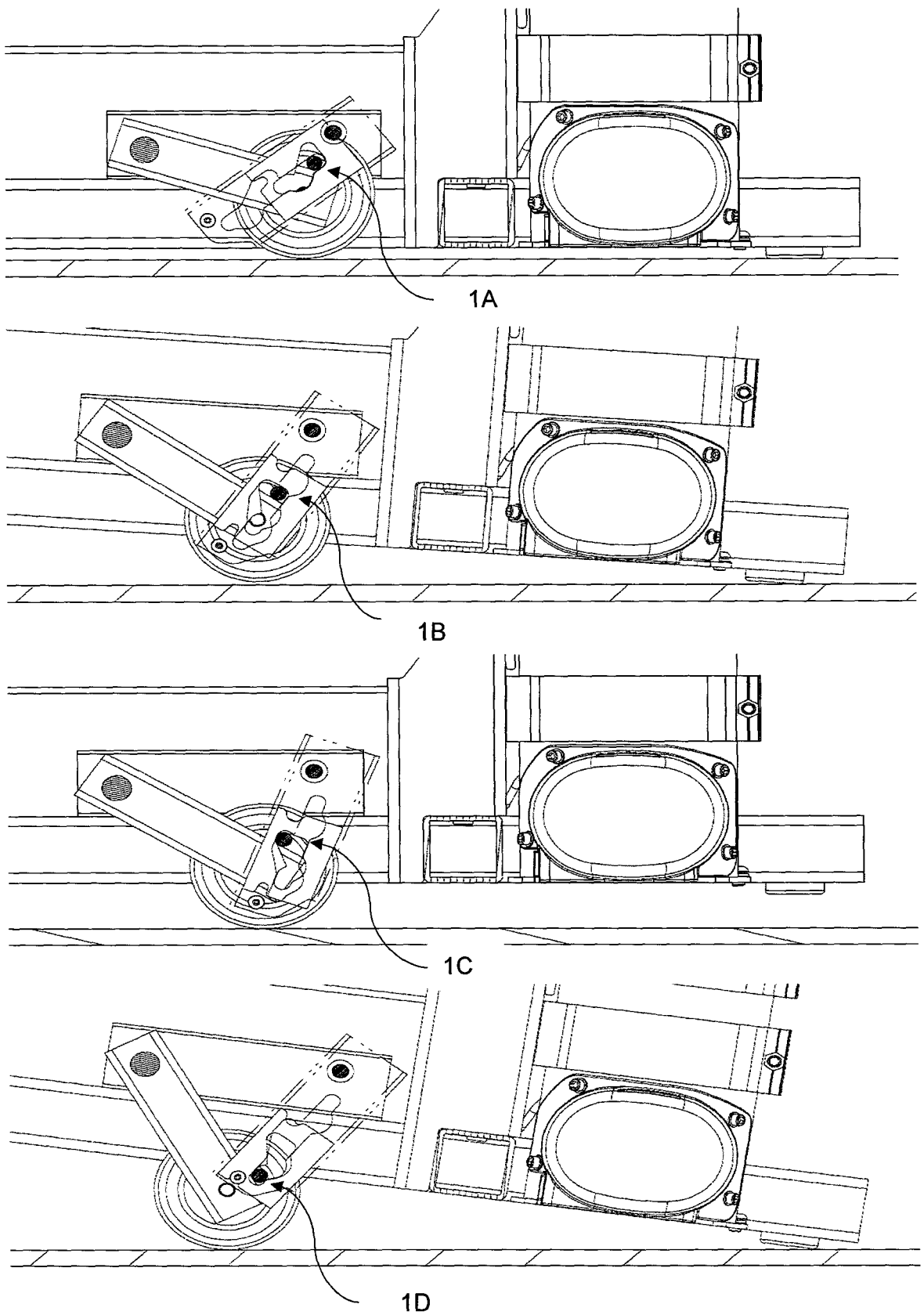

FIG. 9 shows side elevation of the individual positions of a mechanism of an adjustable handling wheel.

EXEMPLARY EMBODIMENTS OF THE INVENTION

Figure 1:
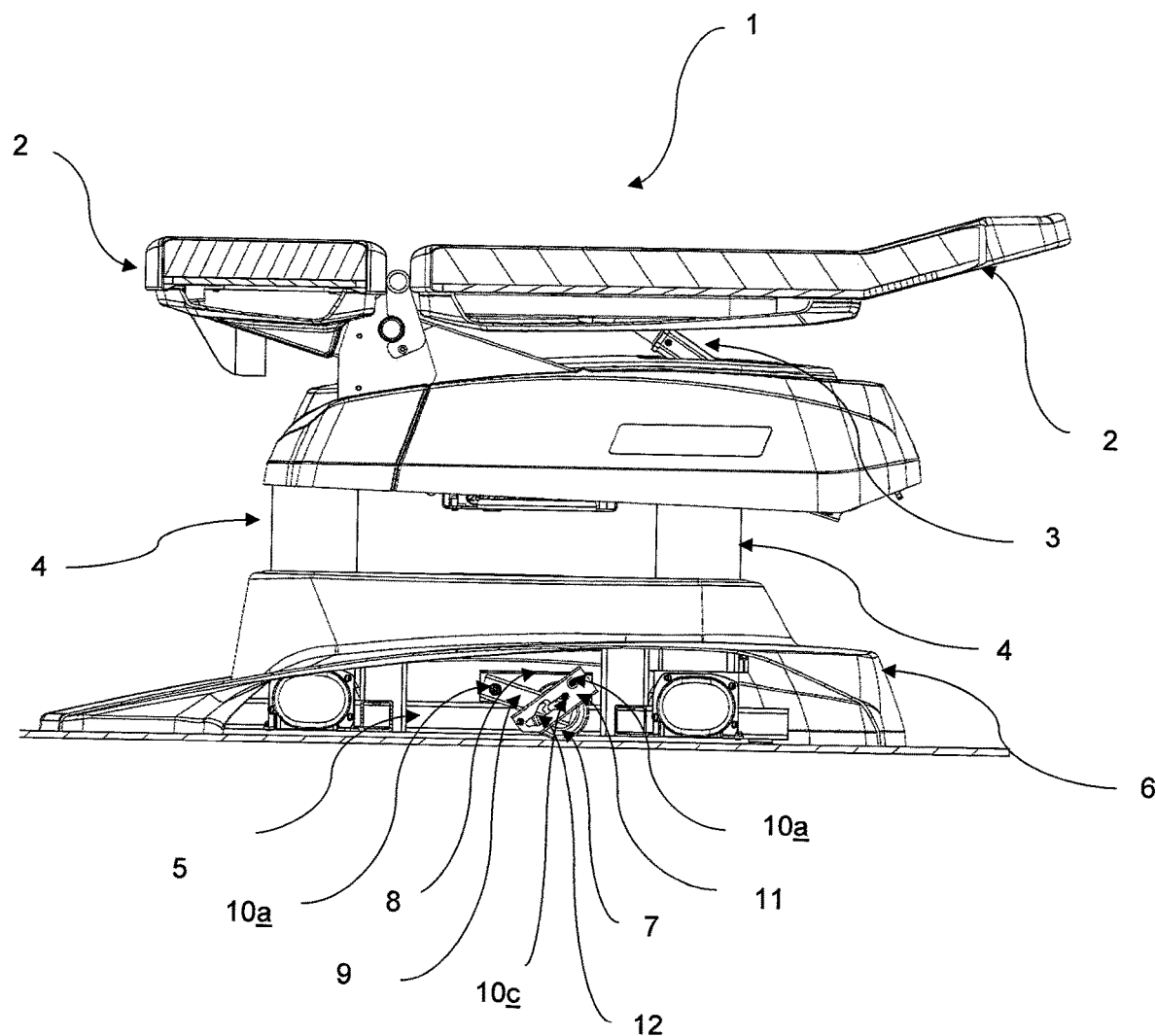

FIG. 1 shows side elevation of an equipment 1, in this case a chair, comprising a support deck 2 divided into a seat part and a backrest part with positionable mechanism 3 of a backrest part of a chair, a lifting mechanism 4, telescopic columns in the preferred embodiment, a base frame 5 of chair, which is covered together with motors of telescopic columns of the lifting mechanism 4 by a cover 6. The cross-section projection of the cover 6 of the base frame 5 shows an adjustable handling wheel 7 fixed on the upper side of the base frame 5 to an elevated supporting member 8, which has a form of a profile or a tube. In the preferred embodiment the supporting member 8 is a part of the base frame 5, or optionally, the supporting member 8 may be attached to the base frame 5 by means of pins, rivets, screws, weld joints or any other convenient method. A mechanism of the adjustable handling wheel 7 is fixed to the elevated supporting member 8. The mechanism of the adjustable handling wheel 7 comprises, in the preferred embodiment, two arms, whereas the first arm, a supporting arm 9, is attached to the supporting member 8 at least at one end of the supporting arm 9, and at another end the supporting arm 9 is attached to the adjustable handling wheel 7. The first supporting arm 9 is attached to the supporting member 8 of the base frame 5 and the adjustable handling wheel 7 by means of pins 10. The supporting arm 9 comprises, in the preferred embodiment, three types of such pins 10, whereas the first pin 10a couples the supporting arm 9 with the supporting member 8, the second pin 10b couples the supporting arm 9 with the adjustable handling wheel 7 and the third pin 10c couples the supporting arm 9 with a control arm 11. The first supporting arm 9 is coupled with the second arm, the control arm 11, by means of pin 10c, which goes to the second control arm 11 through a slotted link 12 and a sliding member 13 of the second control arm 11. The second control arm 11 is attached to the supporting member 8 of the base frame 5 at least at one end by means of a fourth pin 10a and at another end the control arm 11 comprises the slotted link 12, in which the sliding member 13 moves freely. The pin 10c of the first supporting arm 9 of the adjustable handling wheel Z goes through the sliding member 13. The FIG. 1 shows the adjustable handling wheel 7 in the retracted, i.e. non-handling, position 1A, where the base frame 5 of a chair 1 is in the static position with no need to move or transfer it.

Figure 2:
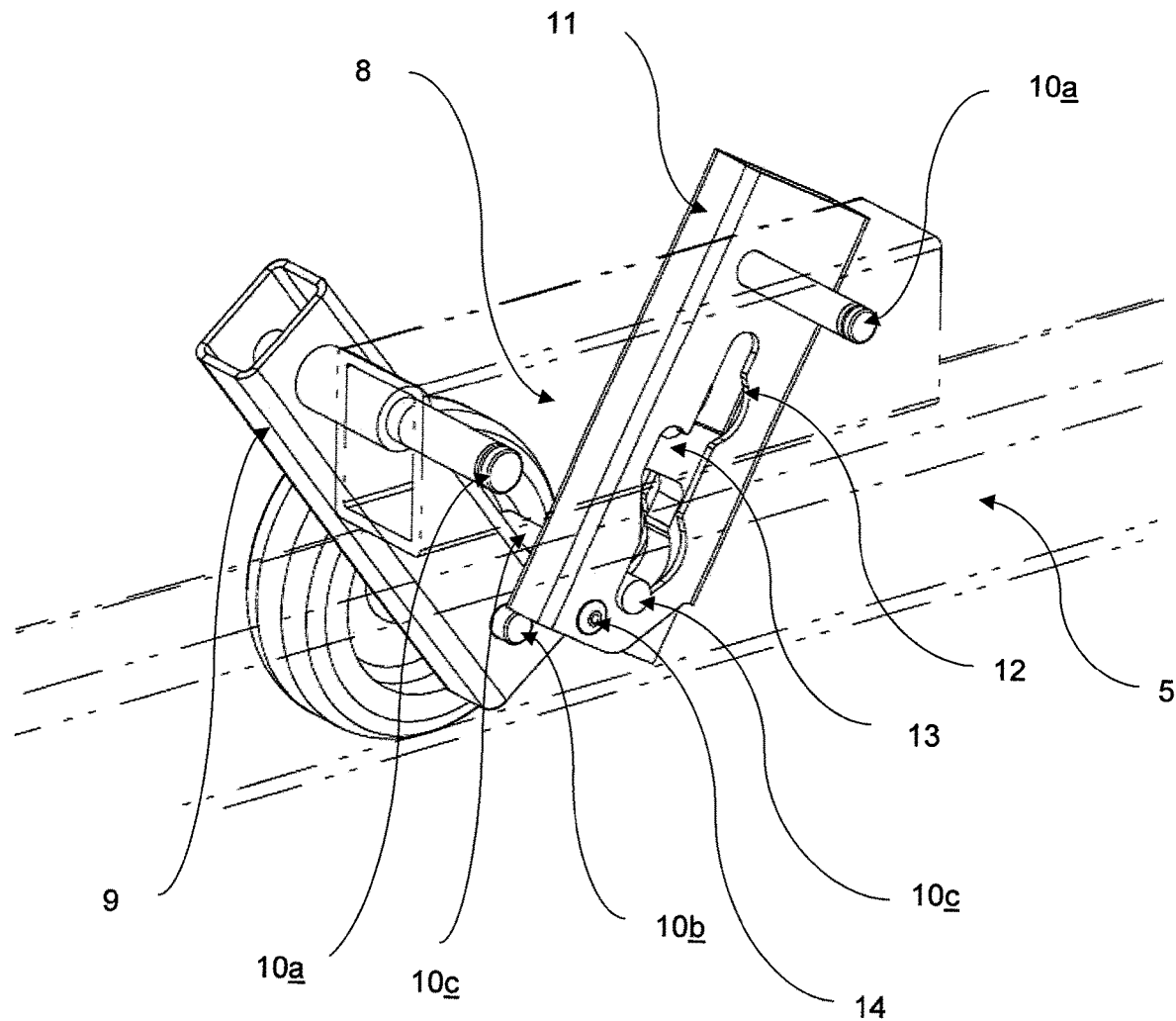

The FIG. 2 shows axonometric projection of a part of a base frame 5 with a mechanism for fixing an adjustable handling wheel Z in the prepared deactivating position 1D. The FIG. 2 obviously shows that the base frame 5 of a chair 1 comprises a supporting member 8 on the upper side, which has a form of a profile or a tube. In the preferred embodiment the supporting member 8 is a part of the base frame 5, or optionally, the supporting member 8 may be attached to the base frame 5 by means of pins, rivets, screws, weld joints or any other convenient method. The supporting member 8 is attached to a supporting arm 9 at least at on end by means of a first pin 10a and at another end the supporting member 8 is fixed to a control arm 11 by means of a fourth pin 10a. The FIG. 2 shows that the supporting arm 9 comprises three pins, whereas at least two pins 10a and 10b are located each at the opposite end in the middle of the supporting arm 9 and at least one of these pins 10a and 10b is coupled with the supporting member 8 at one end and at another end with adjustable handling wheel 7 by means of second pin 10b. In addition, the FIG. 2 shows that the supporting arm 9 comprises a third pin 10c at the upper side of the supporting arm 9 above the second pin je 10b of the adjustable handling wheel 7. The third pin 10c couples the supporting arm 9 of the adjustable handling wheel 7 with the second control arm 11. This third pin 10c of the supporting arm 9 is floatingly coupled with a sliding member 13 in a slotted link 12 of the control arm 11. The control arm 11 has a form of a metal profile which comprises the slotted link 12 and one end in which the sliding member 13 with the third pin 10c of the supporting arm 9 moves freely, whereas the sliding member 13 is locked in the profile by a stopper 14 at least at one end of the sliding member 13. At another end the control arm 11 is coupled with the supporting member 8 by means of a fourth pin 10a, which is located at the opposite end of the control arm 11. Both arms, i.e. the supporting arm 9 and the control arm 11, form in this prepared deactivating position 1D converse isosceles triangle where the adjusting handling wheel 7 is on the vertex of this triangle.

Figure 3:
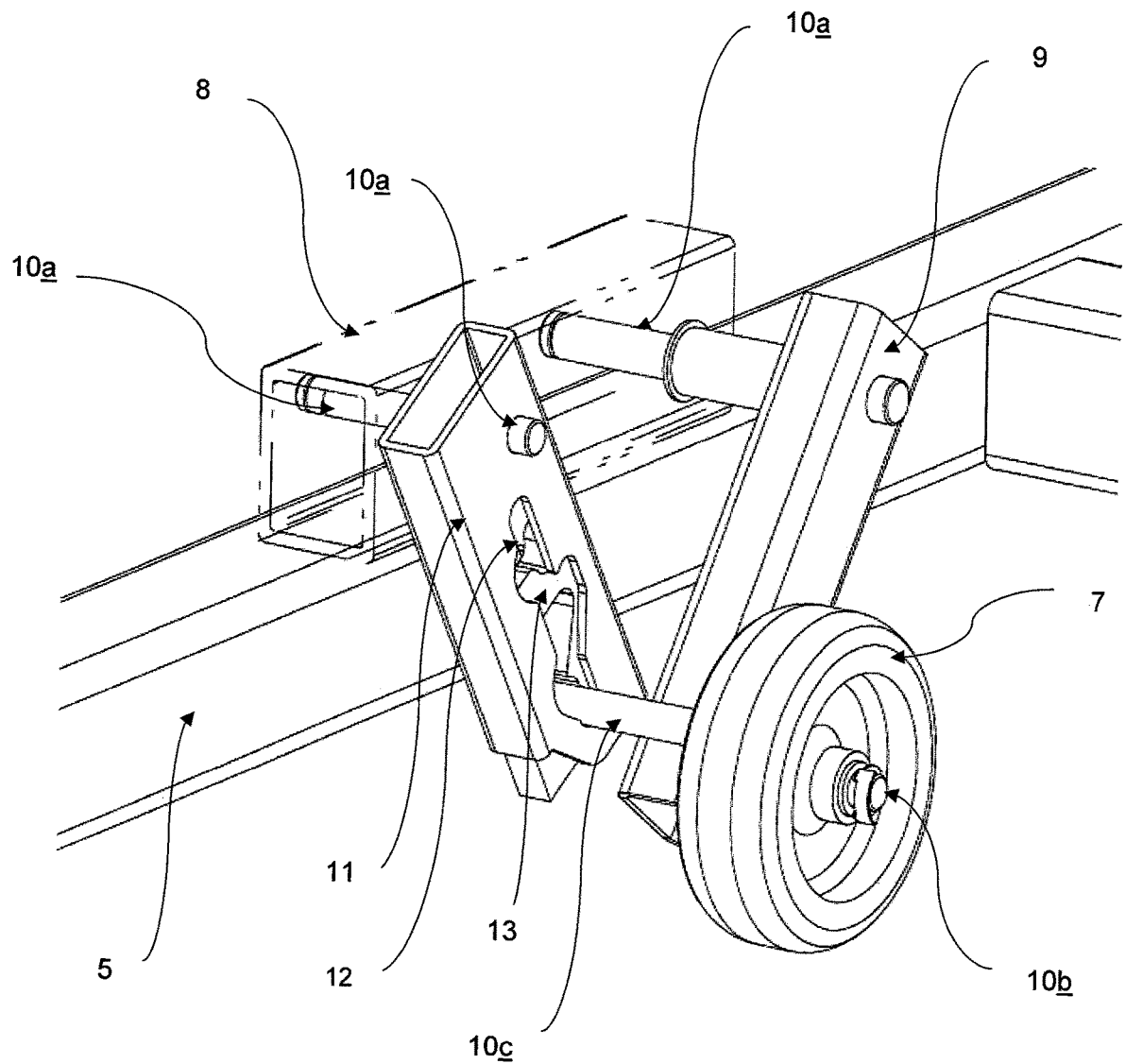
FIG. 3 shows axonometric projection of supporting and fixing of a mechanism of an adjustable handling wheel shown from the inward frame side.

FIG. 3 shows that an adjustable handling wheel 7 is attached to at least one arm, i.e. a supporting arm 9 or a control arm 11, whereas, in the preferred embodiment, the adjustable handling wheel 7 attached to the supporting arm 9 by means of a third pin 10c. In the preferred embodiment, the supporting arm 9 comprises at least three types of a pin, whereas at least two pins 10a and 10b, i.e. a first pin 10a and a second pin 10b, are located each at the opposite end in the middle of the supporting arm 9, where the first pin 10a couples the supporting arm 9 with a supporting member 8 of a base frame 5 at one end, however optionally can be coupled only with the base frame 5. The supporting arm 9 comprises a third pin 10c which is fixed on the upper side of the profile above the second pin 10b of the adjustable handling wheel 7. This third pin 10c couples the supporting arm 9 with the second control arm 11 in a freely moving sliding member 13, which is located in a slotted link 12 of the control arm 11. Optionally, this third pin 10c can be located also on the bottom side of the profile of the supporting arm 9 under the second pin 10b of the adjustable handling wheel 7, optionally the third pin 10c of the adjustable handling wheel 7 can be in parallel the pin 10b to fix the adjustable handling wheel 7 to the control arm 11. The sliding member 13 is secured in the profile of the control arm 11 by a stopper 14 on the bottom side of the profile of the control arm 11. The stopper 14 is in preferred embodiment a rivet, however, can be a profile dummy plug, a screw or any other form of a stopping suitable and rigid enough to keep the sliding member 13 in the slotted link 12 of the control arm 11. The control arm 11 is a positionable arm, in the preferred embodiment it is also a supporting arm. The control arm 11 enables to change a position of the adjustable handling wheel from the retracted, i.e. non-handling, position 1A into prepared activating position 1B, then into the active, i.e. handling, position 1C, then into the prepared deactivating position 1D and finally back into the retracted, i.e. non-handling, position 1A by means of kinematically moving sliding member 13 in the slotted link 12 of the control arm 11.

Figure 4:
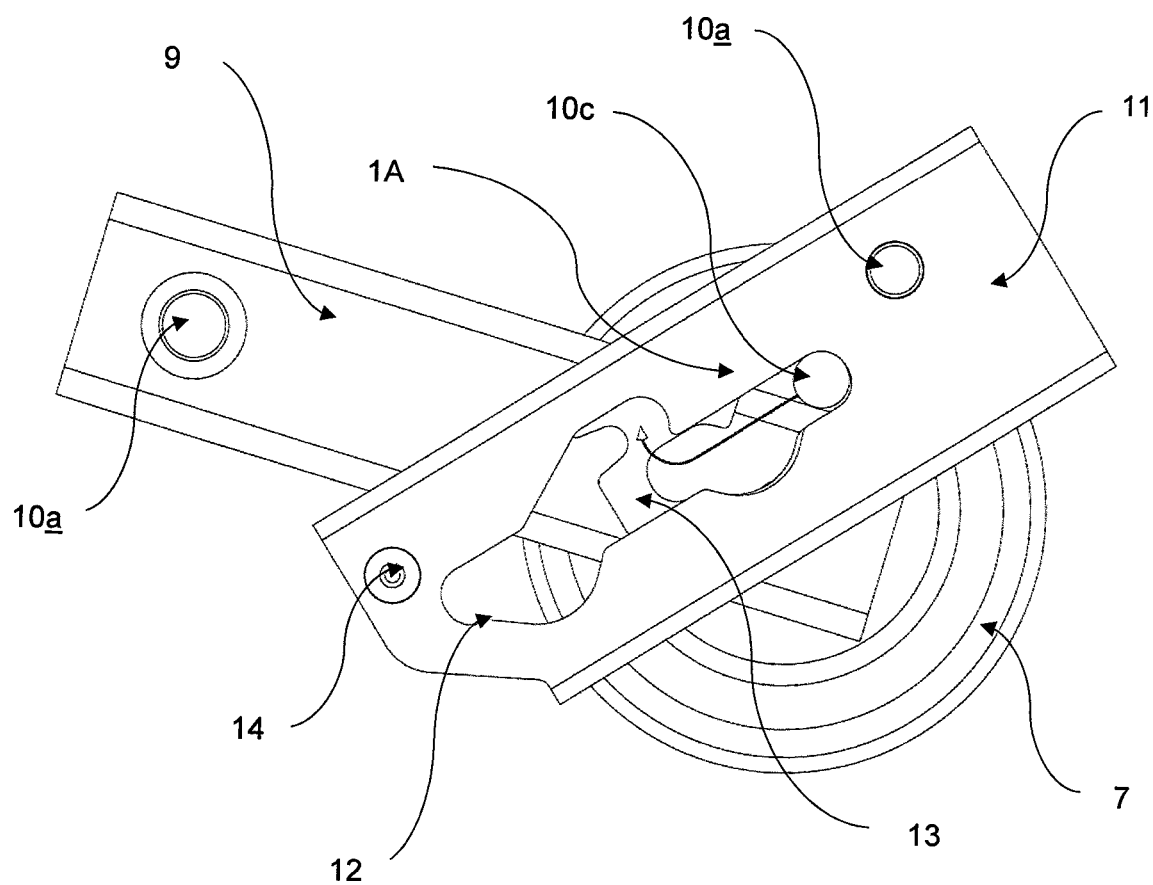
FIG. 4 shows side elevation of a mechanism of an adjustable handling wheel in the retracted, i.e. non-handling, position.

FIG. 4 shows side elevation of a mechanism of an adjustable handling wheel Z, where the adjustable handling wheel 7 is shown in the retracted, i.e. non-handling, position 1A, in other words in the hidden position where the wheel is not visible. In this position the adjustable handling wheel 7 is not able to be used for movement of a chair 1, or any other equipment, from one place to another. The mechanism of the adjustable handling wheel 7 comprises two arms, an arm 9 and an arm 11, wherein the supporting arm 9 bears the adjustable handling wheel 7 and is coupled with the second control arm 11, which comprises a slotted link 12 with a sliding member 13, which is coupled with a third pin 10c of the supporting arm 9 so that the adjustable handling wheel 7 can be positioned from the retracted, i.e. non-handling, position 1A into the active, i.e. handling, position 1C, which is not shown in the FIG. 4. Between these retracted, i.e. non-handling, position 1A and the active, i.e. handling, position 1C there is another position called prepared activating position 1B to activate the adjustable handling wheel Z into the active, i.e. handling, position 1C. Transition into the said positions 1B and 1C is shown on the following figures. The active, i.e. handling, position 1C is followed by prepared deactivating position 1D to deactivate the adjustable handling wheel 7. All positions 1B, 1C and 1D are shown and described on the following figures. The particular position of the adjustable handling wheel 7 is defined by a third pin 10c of the supporting arm 9 according to location of this pin 10c in the slotted link 12 of the control arm 11. The schematic arrow shows a direction in which the third pin 10c will move in the sliding member 13 to use the adjustable handling wheel 7.

In consequence to the FIG. 4, FIG. 5 shows other position of arms 9 and 11, wherein a supporting arm 9 is fixed to a supporting member 8 at least at one its end and at another end it is attached to an adjustable handling wheel 7. Above this point of attachment to the adjustable handling wheel Z the supporting arm 9 comprises a third pin 10c for attaching to the other control arm 11, which is also attached to the supporting member 8 at one end, not shown herein, and at another end the control arm 11 is attached to a sliding member 13 by means of the third pin 10c of the supporting member 9. The sliding member 13 moves in a slotted link 12 of the control arm 11. This pin 10c is fixed tight at the opposite end to the supporting arm 9 on which the adjustable handling wheel 7 is attached to. This position is so called inter-position or prepared activating position 1B, into which the adjustable handling wheel 7 turns to in case the position of a chair 1, or any other equipment, changes by tilting aside (heeling). At the moment, the chair 1 occurs in tilted or heeled level, the sliding member 13 in the slotted link 12 changes position and the pin 10c with the sliding member 13 in the slotted link 12 of the control arm 11 moves thanks to gravitation into the appropriate prepared activating position 1B. In this position the adjustable handling wheel 7 is not ready yet to move.

FIG. 6 shows the active, i.e. handling, position 1C with visible change of position of a pin 10c from the inter-position prepared activating 1B, which is not shown herein, into the active, i.e. handling, position 1C, where the pin 10c is locked by means of a sliding member 13 and a slotted link 12 roughly in the middle of the slotted link 12. In such position a chair 1, or any other equipment, can be easily moved. To secure and lock the active, i.e. handling, position 1C, the pin 10c is locked in a slot of the slotted link 12 by means of the sliding member 13, which provides locking of the chair 1, or any other equipment, above the ground and enables movement of the chair 1 into another place. When locking the pin 10c in the slot of the slotted link 12 by means of the sliding member, the weight of the entire chair 1, or any other equipment, is transferred to the adjustable handling wheel 7 and the base or undercarriage of the chair 1 is raised above the ground frame and the chair 1 can be easily moved. The same as with regards to inter-position prepared activating 1B, the retracted, i.e. non-handling, position 1A changes into the active, i.e. handling, position 1C via the inter-position prepared activating 1B thanks to gravitation when the chair 1 is tilted wherein upon reaching the required position 1C the own weight of the chair 1 levels the chair 1 above the ground.

FIG. 7 shows again the mechanism of arms 9 and 11 of an adjustable handling wheel 7 in another position of the adjustable handling wheel 7—prepared deactivating position 1D. The position is change at the moment, when after using the adjustable handling wheel 7 in the active, i.e. handling, position 1C, a chair 1, or any other equipment, is moved into another required place and is raised up or tilted on one side again so that the position of a pin 10c changes kinematically by means of a sliding member 13 along an axis of a slotted link 12 of a control arm 11 by which a pin 10c reaches it's the lowest position which is prepared deactivating position 1D shown herein. This prepared deactivating position 1D serves for returning the adjustable handling wheel Z into the original position, see the following FIG. 8. Deployment and movement of the adjustable handling wheel 7 is caused by gravitation which impacts the third pin 10c in the sliding member 13 of the slotted link 12, when the pin 10c by help of sliding member 13 moves into the lowest position in the slotted link 12 of the control arm 11.

Consequently, to all said previously, FIG. 8 shows the mechanism of arms 9 and 11 with an adjustable handling wheel Z again in the retracted, i.e. non-handling, position 1A. The FIG. 8 shows a change of position of a supporting arm 9 and a control arm 11, which in preferred embodiment, may be also supporting arm, and a change of position of a third pin 10c, which is located again in the retracted, i.e. non-handling, position 1A, previously described. The third pin 10c of the supporting arm 9 moved from the previous prepared deactivating position 1D in the slotted link 12 of the control arm 11 into the highest position in this slotted link 12, which is enabled by freely moving sliding member 13. Together with the change of position of the third pin 10c also position of the supporting arm 9, to which the adjustable handling wheel 7 is fixed, changes, therefore also position of the adjustable handling wheel 7 changes. The change from prepared deactivating position 1D to another one is caused by own weights by a chair 1, or any other equipment, when the weight helps to move the third pin 10c with the sliding member 13 into the highest position in the slotted link 12 of the control arm 11 by which the adjustable handling wheel 7 returns back into the retracted, i.e. non-handling, position 1A.

The last FIG. 9 shows a part of a chair 1, particularly it shows a part of a base frame 5 with attached mechanism of arms 9 and 11 and an adjustable handling wheel 7. The control arm 11 comprising a slotted link 12 and a sliding member 13 is free coupled with a supporting arm 9 by means of a pin 10c, which moves in the slotted link 12 with the sliding member into the individual positions of the adjustable handling wheel 7.

Position 1A shows an adjustable handling wheel 7 in the retracted, i.e. non-handling, position, where a base frame 5 comprising the adjustable handling wheel Z of a chair 1 in in one level with the ground. When changing the retracted, i.e. non-handling, position 1A into the prepared activating position 1B a sliding member 13 with a third pin 10c will move in the slotted link 12 thanks to gravitation impacting the freely supported sliding member 13 with the third pin 10c in the slotted link 12, which enables change of a position into another position, which is prepared activating position 1B.

Position 1B shows the adjustable handling wheel 7 in the prepared activating position where a base frame 5 comprising the adjustable handling wheel 7 is in the tilted position after a chair 1, or any other equipment, is raised up above the ground. By raising the chair 1 above the ground a third pin 10c of a supporting arm 9 releases in a slotted link 12 of a control arm 11 and the pin 10c moves into the prepared activating position 1B thanks to freely moving sliding member 13 and gravitation which impacts the chair 1 in the tilted position above the ground.

FIG. 9 also shows active, i.e. handling, position 1C of an adjustable handling wheel 7. In this position the adjustable handling wheel 7 touches the ground and a base frame 5 of a chair 1, or any other equipment, is above the ground raised up. The adjustable handling wheel 7 can be used to move or transport the chair 1, or any other equipment, into the desired place. Also in this case, movement of a pin 10c with a sliding member 13 in a slotted link 12 of a control arm 11 is caused by gravitation which impacts the adjustable handling wheel 7 upon movement of the pin 10c with the sliding member 13 into the middle part of the slotted link 12 and in parallel, the weight of the chair 1, or any other equipment, impacts the pin 10c and the adjustable handling wheel 7 in this active, i.e. handling, position 1C.

Another shown position 1D of an adjustable handling wheel 7 of a chair 1, or any other equipment, is prepared deactivating position 1D, which shows a tilted base frame 5, when a third pin 10c moves by means of a sliding member 13 in a slotted link 12 into the lowest part of the slotted link 12 or a control arm 11. In this position the base frame 5 of the chair 1 returns back to the position 1A, it means into the retracted, i.e. non-handling, position 1A, where the chair 1 stand statically on the ground where the chair 1 was moved. Movement of the pin 10c with the sliding member 13 in the slotted link 12 into the prepared deactivating position 1D is again influenced by gravitation, whereas change of movement back to the retracted, i.e. non-handling, position 1A is caused by weight of the chair 1, or any other equipment, which transferred to the mechanism of the control arm 11, in which the third pin 10c of the supporting arm 9 moves with sliding member 13 into the highest part of the slotted link 12, it means to the initial retracted, non-handling, position 1A.

LIST OF REFERENCES

1) Chair (equipment)
2) Support deck

3) Positionable mechanism of backrest part
4) Lifting mechanism of a chair
5) Base frame (undercarriage)
6) Cover of the base frame
7) Handling wheel
8) Supporting member
9) Supporting arm
10a), 10b), 10c) First and fourth pin, second pin, third pin
11) Control arm
12) Slotted link
13) Sliding member
14) Stopper
1A—deployed, i.e. non-handling, position
1B—prepared activating position
1C—active, i.e. handling, position
1D—prepared deactivating position

The invention claimed is:

1. A retractable and deployable wheel assembly for a base frame of equipment comprising:
    a wheel;
    a supporting member;
    a supporting arm pivotally connected at a first end to the supporting member by a first pin and connected at a second end to the wheel by a second pin;
    a control arm comprising a slot;
    a sliding member longitudinally slidable within the control arm;
    the supporting arm further comprising a third pin, the third pin received in the sliding member and the slot of the control arm;
    the control arm is pivotally attached to the supporting member by a fourth pin;
    wherein when the sliding member and the third pin are at a first end of the slot, the wheel is held in a retracted position with respect to the supporting member;
    wherein tilting the assembly slides the sliding member along the control arm and moves the third pin to an intermediate position in the slot, and releasing the assembly in the intermediate position holds the wheel in a deployed position with respect to the supporting member.

2. The retractable and deployable wheel assembly for a base frame of equipment of claim 1, wherein tilting the assembly when the wheel is in the deployed position slides the sliding member further along the control arm and moves the third pin to a second end of the slot, and releasing the assembly moves the sliding member and the third pin back to the first end of the slot and the wheel back to the retracted position.

3. The retractable and deployable wheel assembly for a base frame of equipment of claim 1, wherein the control arm and the supporting arm are connected to opposite ends of the supporting member.

* * * * *